KENNETH F. SEIL
PAUL F. SWIFT
INVENTORS

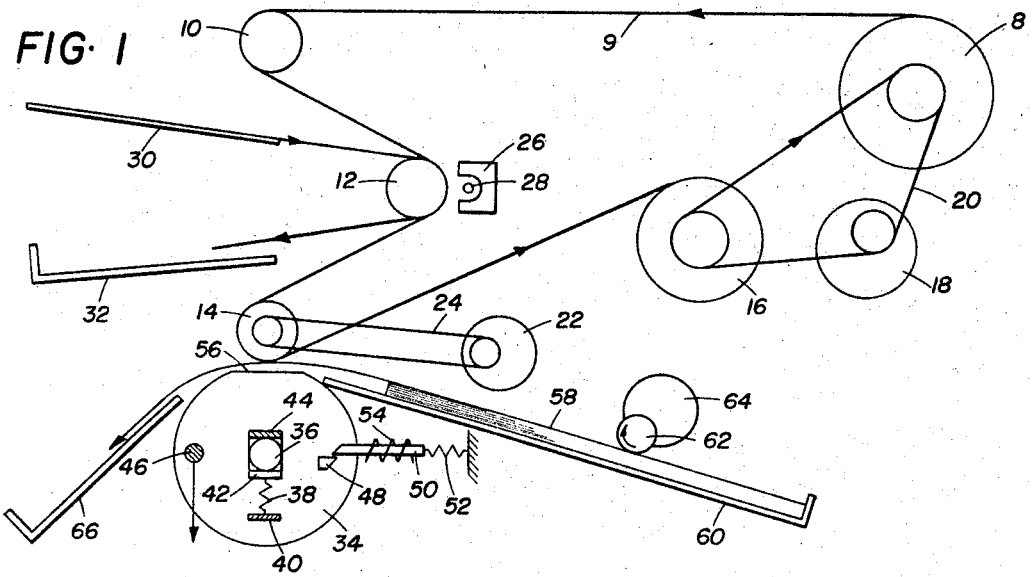
FIG. 1
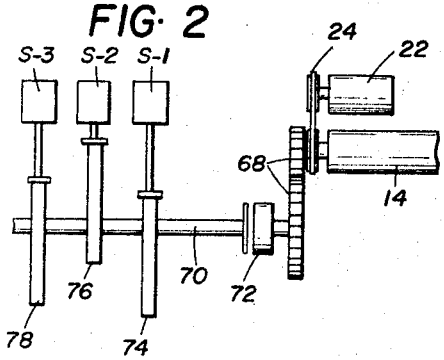
FIG. 2
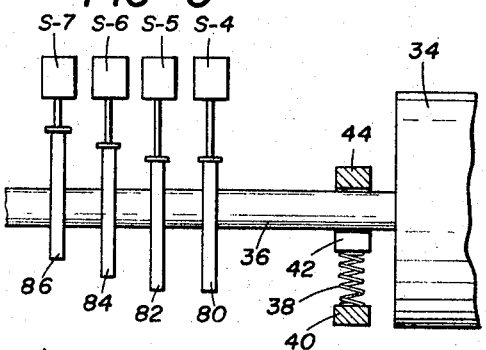
FIG. 3
FIG. 3A
FIG. 2A
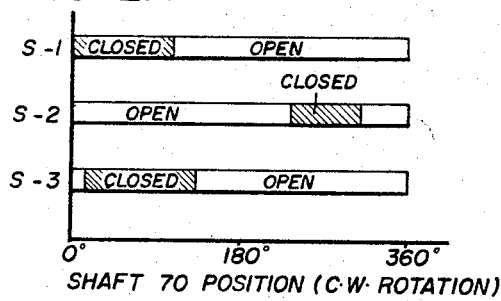
KENNETH F. SEIL
PAUL F. SWIFT
INVENTORS

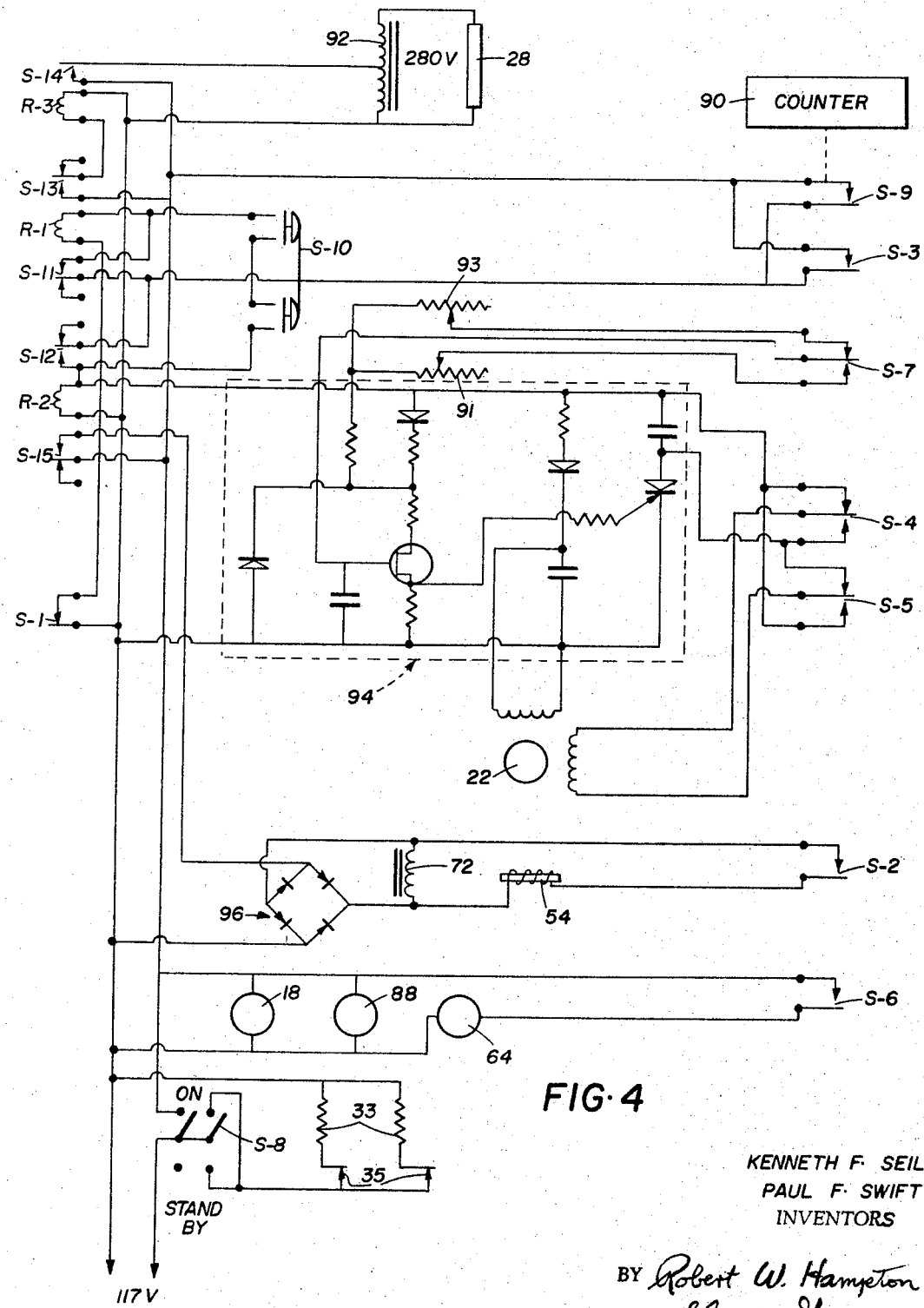

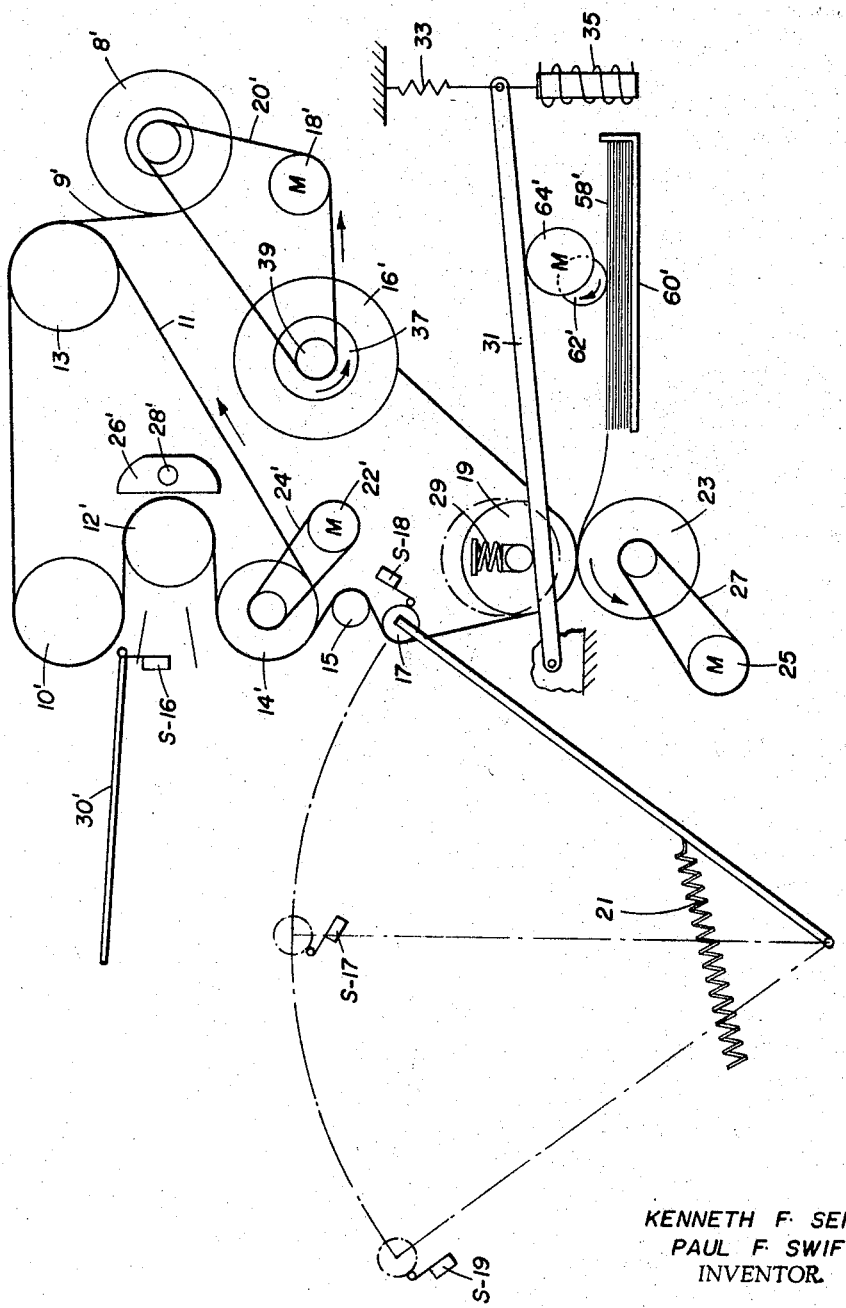

United States Patent Office 3,437,806
Patented Apr. 8, 1969

3,437,806
THERMOGRAPHIC COPYING APPARATUS FOR MAKING A PREDETERMINED NUMBER OF COPIES
Kenneth F. Seil, Rochester, and Paul F. Swift, Penfield, N.Y., assignors to Eastman Kodak Company, Rochester, N.Y., a corporation of New Jersey
Filed Mar. 25, 1966, Ser. No. 537,472
Int. Cl. G01n 21/34
U.S. Cl. 250—65     6 Claims

ABSTRACT OF THE DISCLOSURE

A copying machine having a web matrix which is movable in intimate pressure contact with an original through an exposing station and having the original removed therefrom immediately after exposure. The exposed matrix is then moved into intimate pressure engagement with a receiving sheet for producing a copy of the original. The machine includes means for reciprocally moving the web in timed relation relative to a copying station so that a plurality of discrete receiving sheets can be fed into engagement with the web to provide for making any predetermined number of copies.

---

This invention relates generally to copying devices, and more specifically to a copying device in which a web matrix is thermographically exposed with an original, and copies of the original are made by pressing the exposed matrix into pressure engagement with a receiving paper.

It is known in the art to thermographically expose a sheet matrix in combination with an original in a thermocopying machine of the type disclosed in U.S. Patent 2,891,165. Such exposure will produce a chemical change in the matrix, and when the matrix and a receiving paper composite are run through a heated pressure roller device, a copy of the original appears on the receiving paper.

One of the disadvantages of the prior known copying method and apparatus is that only one copy can be produced during any one operation. Applicants' invention is directed to a copying device utilizing a web matrix and capable of automatically producing a plurality of copies.

This invention includes within its scope a copying machine having a web matrix which is movable in intimate pressure contact with an original through an exposing station, the original removed, and then the exposed matrix moved into intimate pressure engagement with a receiving paper for producing a copy of the original on the receiving paper. Means are provided in the copying machine for reciprocally moving the web in timed relation with a receiving paper feeding means to provide a plurality of copies.

One of the objects of the present invention is to provide an improved thermographic copying device for making a plurality of copies.

Another object of the invention is to provide an improved thermographic copying device that will expose a matrix-original sandwich, return the original to the operator, and automatically make a preselected number of copies from the matrix.

Another object of the invention is to provide an improved thermographic copying device that is of simple design and construction, thoroughly reliable and efficient in operation, and economical to manufacture.

Objects and advantages other than those set forth above will be apparent from the following description when read in connection with the accompanying drawings, in which:

FIG. 1 is a schematic front elevation view of a thermographic copying device constructed in accordance with one embodiment of this invention;

FIG. 2 is a segmental front elevation view of the mechanism of FIG. 1 showing the switch mechanism controlled by cams on a shaft driven by a reversible drive motor;

FIG. 2A is a cam-timing chart showing the relationship between the switch mechanism and cams of FIG. 2 when the motor transports the web in the direction of the arrow in FIG. 1;

FIG. 3 is a view similar to FIG. 2 showing the switch mechanism controlled by cams on the drum shaft;

FIG. 3A is a cam-timing chart showing the relationship between the switch mechanism and cams of FIG. 3 upon counterclockwise rotation of the drum of FIG. 1 through one revolution;

FIG. 4 is an electrical circuit diagram for the copier of FIG. 1;

FIG. 5 is a schematic side elevation view of a thermographic copying device constructed in accordance with another embodiment of this invention.

Figure 6:
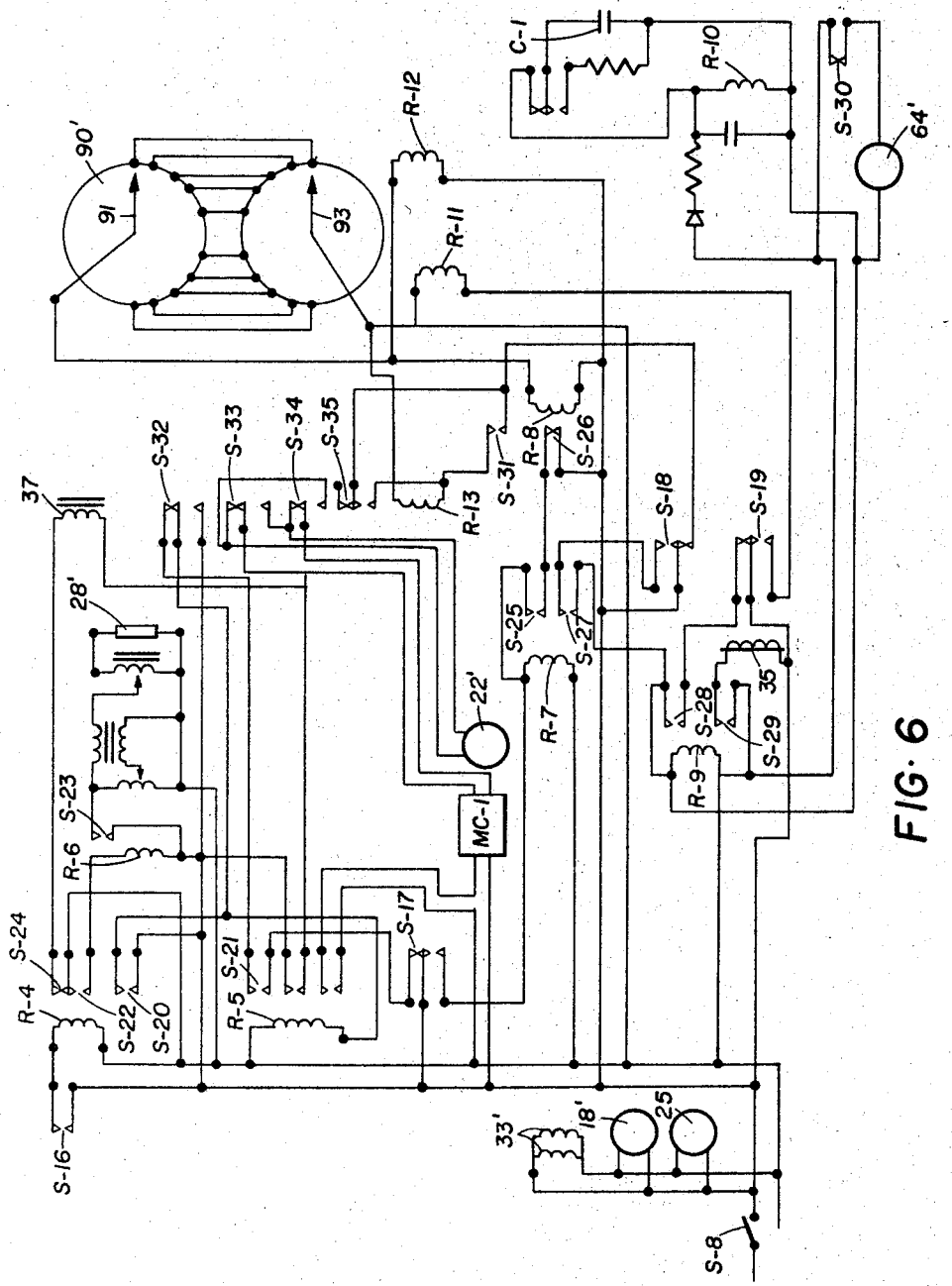
FIG. 6 is an electrical circuit diagram for the copying device of FIG. 5.

Referring to FIGS. 1–3, the thermographic copying device comprises a supply reel 8 of matrix material 9 in web form having one end connected to supply reel 8, and its opposite end threaded over a guide roller 10, a backup roller 12, a drive roller 14 and then secured to a take-up reel 16. The supply and take-up reels 8, 16 are both tendency driven in the same clockwise direction by a motor 18 and belt 20. The drive roller 14 is positively driven by a reversible motor 22 through a belt 24.

The exposing station for the copying device comprises the aforementioned backup roller 12, and a lamp unit comprising a reflector 26 housing a lamp 28. The lamp 28 is of any suitable type capable of emitting a high quantity of infrared radiation. An original document 30 which is to be copied is fed into the nip formed by web 9 and backup roller 12, and is then carried in intimate pressure contact with web 9 around backup roller 12 by the action of web 9 and roller 12 for exposure. After passing through the exposing station, the document 30 is separated from web 9 and directed into a receptacle 32. A stripper blade or deflector, not shown, may be used to assure separation of document 30 from web 9, and for directing it into receptacle 32.

The copying station comprises a drum 34 whose shaft 36 is supported at each end by a helical spring 38, only one of which is shown, interposed between a fixed support 40 and a shaft bearing 42. An adjustable bearing 44 that may be fixed in any selected position by any suitable lock means, not shown, cooperates with shaft 36 to provide an adjustable stop for drum 34 to position it in a predetermined position with respect to the aforementioned drive roller 14. The drum 34 may be heated by any suitable heating means, not shown. The drum 34 is provided with an off-center weight 46 for moving drum 34 in a counterclockwise direction as seen in FIG. 1, causing a fixed latch element 48 mounted thereon to engage a reciprocally movable spring-biased latch member 50. The spring 52 normally urges latch member 50 into a position in which it intercepts latch element 48 for releasably holding drum 34 in its normal or initial position. The latch member 50 constitutes the plunger of a solenoid 54 which, when energized, withdraws latch member 50 against its spring 52, releasing latch element 48. The drum 34 has a flat surface 56, which in the initial position of drum 34, is spaced from the aforementioned drive roller 14. When latch element 48 is released by solenoid 54, drum 34 is moved by its off-center weight 46 until its periphery engages drive roller 14. Since the radius of drum 34 is slightly greater than the distance between the axis of drum 34 and the periphery of drive roller 14, the drum 34 will stop as soon as its periphery engages drive roller 14.

A receiving sheet feeding mechanism is located near the copying station for feeding receiving sheets 58, one at a time, into the nip formed by drive roller 14 and heated drum 34 following engagement of the two. This mechanism comprises a receiving sheet holder 60 for holding a stack of receiving sheets 58, and a sheet feed roller 62 resiliently biased into engagement with the stack of sheets and driven by any suitable motor 64.

The receiving sheet 58 is transported between drive roller 14, now driven in a reverse direction, and heated drum 34 where it is pressed into intimate engagement with web 9. After sheet 58 passes through drive roller 14 and drum 34, it is automatically separated from web 9 and deposited in a receptacle 66 near the operator. Any suitable stripper or deflector, not shown, may be used to aid in the separation of sheet 58 from web 9.

The operation of motors 18, 22, lamp 28, latch 48, 50 etc., in timed relation is provided by a plurality of cams and switches as seen in FIGS. 2 and 3. The drive roller 14 is connected by a gear train 68 to a cam shaft 70 through a magnetic clutch 72, and cam shaft 70 has a plurality of cams 74, 76, 78 for operating corresponding respective micro-switches S-1, S-2, S-3. The drum 34 also has a plurality of eccentric cams 80, 82, 84, 86 mounted on its shaft 36 for actuating corresponding respective microswitches S-4, S-5, S-6, S-7.

The operation of the thermographic copying device will now be described with particular reference to FIG. 4. Initially, the start switch S-8 is in a "standby" position, connecting the power supply to heaters 33 of drum 34 for heating the copying station to a predetermined copying temperature such as 165° F. and maintaining this temperature plus or minus 5° F. by the thermostats 35. If the operator wants to make copies, the start switch S-8 is switched to the "on" position, energizing drive motor 18 of supply and take-up reels 8, 16 respectively, and an exposure station cooling fan motor 88. Since the supply and take-up reels 8, 16 respectively are tendency-driven, and the force required to drive them is greater than the tendency drive, the belt 20 will merely slip and web 9 will remain stationary. The operator then turns a counter 90 to a position indicating the number of copies, normally from 1–15, that he desires. Setting the counter automatically closes a microswitch S-9, which is normally open if counter 90 has not been set to make one or more copies, connecting the power supply to a push-start button switch S-10. A switch S-3 in parallel with switch S-9 is in its normal open position. When the operator then pushes the start button S-10, relays R-1, and R-2 are energized to close their normally open switches S-11, S-13 and S-12, S-15 respectively. Line voltage is also applied to the D.C. motor-controller circuit 94, since it is connected in parallel with the coil of relay R-2. Relay R-2 remains energized as long as microswitches S-3 or S-9 are closed. Relay R-1 remains energized as long as microswitches S-1, and S-3, or S-9, are closed. When relay R-1 is energized and its switch S-13 closed, relay R-3 is energized, closing its normally open switch S-14 to apply line voltage to the primary 92 of the lamp transformer for turning on the infrared exposing lamp 28. When normally open switch S-15 is closed by relay R-2, it supplies line voltage to the DC rectifier 96, and energizes the magnetic clutch 72 for connecting drive shaft 70 to drive motor 22 as seen in FIG. 2. The drive motor 22, which has been energized by the DC motor-controller circuit 94 as above described, now begins to transport matrix 9 from supply reel 8 to take-up reel 16 where it is taken up by the tendency drive. When approximately 11 inches of matrix 9 along with an original 30 fed therein by the operator has been exposed in the exposing station, cam 74 opens normally closed microswitch S-1, de-energizing relays R-1 and R-3, causing exposure lamp 28 to be turned off. Since relay R-2 is still energized, matrix 9 continues to move through the machine until the trailing edge of the exposed area of the matrix is about to leave the surface of drive roller 14. At that time, cam 76 closes microswitch S-2, energizing latch solenoid 54 which releases latch element 48.

As soon as the latch is released, drum 34 is rotated in a counterclockwise direction due to its off-center weight 46 until the periphery thereof engages drive roller 14. The initial movement of drum 34 causes cams 80 and 82 to operate double-throw microswitches S-4, S-5 to reverse drive motor 22. Substantially simultaneously, cam 86 on the shaft of drum 34 operates microswitch S-7 in the motor controller circuit 94, substituting a 50,000-ohm potentiometer 91, which has been preset to give proper copying speed, for the original 50,000-ohm potentiometer 93 preset to give proper exposure speed. As drum 34 and roller 14 move into pressure engagement, cam 84 momentarily closes microswitch S-6, energizing the receiving paper feed motor 64 for feeding a sheet of receiving paper 58 into the nip of drum 34 and roller 14. The web and receiving paper will now be transported to the left, between roller 14 and drum 34 to produce on the paper a copy of the image on the web. The web and receiving paper will now be transported to the left, between roller 14 and drum 34 to produce on the paper a copy of the image on the web. When drive roller 14 has driven drum 34 through approximately one revolution, during which the trailing (originally leading) edge of the exposed area of the matrix and receiving paper superimposed therewith have passed through roller 14 and drum 34 to make a copy, roller 14 loses driving contact with drum 34 when flat surface 56 of roller 34 is reached, but drum 34 continues to turn by virtue of its off-center weight 46 until latch element 48 engages latch element 50. This completes one cycle of operation, and the timing of the opening and closing of the various microswitches is controlled by the cam configurations and their orientation with respect to their drive shafts 36, 70. At the completion of one cycle, the switches S-4, S-5 and S-7 are returned to their original positions by cams 80, 82 respectively to cause motor 22 to rotate roller 14 in its forward or counterclockwise direction at exposure speed. Now the copying cycle will be repeated since S-9 is still closed and relay R-2 energized until counter 90 has been moved to the zero position by any suitable ratchet mechanism, not shown, on shaft 36, opening microswitch S-9. Relay R-2, however, still remains energized through microswitch S-3. When latch 50 is released by switch S-2 and motor 22 reversed by switches S-4 and S-5, the drive motor 22 will transport matrix 9 onto take-up reel 16 until the originally trailing edge of the exposed area of the matrix is moved just past the exposure station. At that time, microswitch S-3 is opened by cam 78, and relay R-2 and drive motor 22 are de-energized turning off the machine. Magnetic clutch 72 is also de-energized allowing shaft 70 to return to its normal position by any suitable means, not shown. The exposing and copying cycle has been completed, and start switch S-8 is then manually moved to its "standby" position.

In the modification of the invention disclosed in FIGS. 5 and 6, parts similar to parts disclosed in FIGS. 1–4 will be denoted by the same numerals primed. A transport mechanism is disclosed for transporting matrix web 9' from supply reel 8' onto take-up reel 16', and for transporting an original 30' in intimate pressure engagement with the matrix through an exposing station. The transport mechanism comprises a transparent belt 11 trained over a pair of guide rollers 10', 13, a back-up roller 12' for the exposing station, and a transport roller 14'. An exposure lamp 28' capable of producing radiation rich in infrared is spaced from back-up roller 12' for exposing the original 30' and matrix 9' as it passes thereover. A reflector 26' is provided for focusing the radiation. The transport roller 14' is driven by a transport motor 22' and belt system 24'.

The leading end of matrix 9' after it leaves the transport mechanism is threaded over a guide roller 15, over a pivotally mounted rod 17 serving as a web accumulator, over a roller 19 of the copying station, and then secured to take-up reel 16'. The supply and take-up reels 8', 16' are urged in a counterclockwise direction by a belt 20' driven by a tendency drive motor 18'. The accumulator rod 17 is mounted for pivotal movement in a counterclockwise direction, and is biased in that direction by a spring 21. A drive roller 23 is rotatably mounted below roller 19, and is drivable by a motor 25 and belt 27. The roller 19 is vertically movable, and is provided with springs 29, only one of which is shown, for urging roller 19 downwardly into pressure engagement with roller 23. The roller 19 is movable out of engagement with roller 23 by a lever 31 pivoted in a counterclockwise direction about one end by a spring 33 secured to the other end. The spring 33 is of sufficient strength so that in its normal position it will lift roller 19 against the bias of its springs 29 out of engagement with roller 23. A solenoid 35 is connected to the end of lever 31 in opposition to spring 33, and when energized moves lever 31 in a clockwise direction against the bias of spring 33 allowing roller 19 to be moved by gravity and its spring 29 into engagement with roller 23. A holder 60' for a stack of receiving sheets 58' is positioned near rollers 19, 23 and a sheet feed roller 62' is provided driven by any suitable motor 64' for singly feeding the sheets 58 from holder 60' into the nip of pressure rollers 19, 23.

In the operation of this machine, and with specific reference to FIGS. 5 and 6, a start switch S–8 is closed supplying power to the heating coils 33' in rollers 19, 23 and to motors 18', 25. The manually settable wiper 91 of counter 90' is set to the desired number of copies. A document 30', introduced into the nip formed by belt 11 and back-up roller 12', trips a microswitch S–16 energizing relay R–4 as long as the document is in engagement with switch S–16. Relay R–4 closes its switch S–20 thereby energizing relay R–5, which is locked closed through switch S–21 of relay R–5 and the normally closed contacts of switches S–32 and S–17. Transport motor 22' is energized through the contacts of R–5. Relay R–4 also closes switch S–22, energizing relay R–6 which in turn closes its switch S–23 to energize exposure lamp 28'. Transport motor 22' overcomes the tendency drive on supply reel 8', and transports belt 11 in the direction of the arrow in FIG. 5, advancing the matrix 9' and original 30' through the exposing station for exposure. When the trailing edge of original 30' releases microswitch S–16, relay R–4 is de-energized, lamp 28' is extinguished and magnetic brake 37 acting on a shaft 39 of take-up reel 16' is actuated through normally closed switch S–24 of relay R–4 to stop further rotation of the take-up reel 16'. Since drive motor 22' is still energized, the matrix 9' continues to advance, and the slack developed therein will now be taken up or accumulated by accumulator rod 17 under the action of spring 21. The slack continues to be taken up by rod 17 until the latter actuates a microswitch S–17, opening its normally closed switch contacts to de-energize relay R–5, which in turn de-energizes transport motor 22' and magnetic brake 37. The normally open switch contacts of S–17 are closed momentarily, energizing relay R–7 and causing it to lock in through its now closed switch S–25 and the normally closed switch S–26 of relay R–8. The take-up reel 16' now begins to once again wind up the slack matrix 9' until, as the leading end of the exposed portion of the matrix moves to a position adjacent the nip formed by pressure rollers 19, 23, accumulator rod 17 engages and closes the normally open contacts of a microswitch S–18 to complete a circuit to relay R–9 by way of closed switch S–27 of relay R–7. Relay R–9 is energized and locked in through its now-closed switch S–28 and the normally closed contacts of switch S–19. Solenoid 35 is energized through switch S–29 of relay R–9, pivoting lever 31 in a clockwise direction, allowing roller 19 to move into pressure engagement with roller 23. When power is applied to relay R–9, it is also applied to a relay R–10 and to receiving sheet feed motor 64' through normally closed switch S–30 of relay R–10. Motor 64' is immediately energized, feeding a sheet of receiving paper 58' into the nip formed by pressure rollers 19, 23. Relay R–10, however, is not immediately energized when power is first applied to it, since it is effectively shorted by a capacitor C–1. As the charge on capacitor C–1 builds up, relay R–10 is energized, opening switch S–30 and de-energizing paper feed motor 64'. The drive roller 23, which is constantly driven in a counterclockwise direction as seen in FIG. 5, overcomes the tendency drive exerted by motor 18' on take-up reel 16' and transports matrix 9' and receiving sheet 58' to the left, through pressure rollers 19, 23. Since drive roller 14' is stationary, slack will once again be developed in the matrix 9' between rollers 14' and 19 and will be accumulated by accumulator rod 17. The rod 17 continues to accumulate matrix 9' until the completed copy reaches a position wheer it can fall from the nip of pressure rollers 19, 23, at which time accumulator 17 actuates microswitch S–19, whose normally closed switch contacts are opened, de-energizing relay R–9 and solenoid 35 and allowing pressure rollers 19, 23 to separate under the action of spring 33. As soon as this occurs, the tendency drive motor 18' rewinds matrix 9' onto take-up reel 16', once again pulling accumulator rod 17 in a clockwise direction. Actuation of microswitch S–19 also closes its normally open switch contacts providing a short power pulse to a stepping relay R–11 actuating any suitable ratchet mechanism or the like, not shown, to move a counter wiper 93 one position from its normal zero position, thus counting the first copy. When rod 17 is pulled up to the point where it again actuates microswitch S–18, the copying operation is repeated to produce a second copy. When the last copy is produced and microswitch S–19 energizes relay R–11 to move wiper 93 one step, it will momentarily complete a circuit through the manually settable wiper 91 of counter 90' for momentarily energizing a reset relay R–12 for returning wiper 93 to its normal zero position, and momentarily energizing relay R–8 for opening switch S–26 thereby de-energizing relay R–7, and bringing to an end the repetition of the printing cycle. The relay R–8 further momentarily closes switch S–31 energizing a relay R–13 which remains energized through normally open switch S–35, now moved to its closed position. Closure of switch S–32, also by relay R–13, energizes relay R–5 supplying power to the motor control MC–1 for transport motor 22', and energizes magnetic brake 37 on shaft 39 of take-up reel 16'. Closure of switches S–33 and S–34 by relay R–13 reverses transport motor 22', causing matrix 9' to be rewound onto supply reel 8' by tendency drive motor 18'. The accumulator rod 17 is pulled in a clockwise direction until it actuates microswitch S–18 opening its normally closed switch contacts, de-energizing relays R–5 and R–13, and stopping transport motor 22'. All relays having returned to their original positions, the copier is ready to receive the next document, and to make a predetermined number of copies thereof determined by the manual setting of wiper 91 of counter 90'.

The invention has been described in detail with particular reference to preferred embodiments thereof, but it will be understood that variations and modifications can be effected within the spirit and scope of the invention as described hereinabove, and as defined in the appended claims.

We claim:

1. A thermographic copying device for making a copy of an original on receiving paper, comprising:
an exposing station for producing radiation rich in infrared;
a copying station;
transport means including means for transporting a heat sensitive web and original composite through said exposing station to thermographically produce an image of said original in a corresponding area of said web, and for transporting only said web along after passage through said exposing station to a first position in which one end of said area of said web is positioned at the entrance of said copying station;

means responsive to movement of said web to said first position for feeding the leading end of a receiving paper into registering engagement with said one end of said area of said web; and control means for said transport means for causing the latter to transport said receiving paper and web in intimate pressure contact through said copying station for producing a copy of said original on said receiving paper and to transport only said web along after passage through said copying station to a second position in which the other end of said area of said web is positioned at the exit side of said copying station.

2. The invention according to claim 1 wherein said control means includes means fo rcausing said transport means to reciprocally move said web between said first and second positions in timed relation with said receiving paper feeding means for producing a plurality of copies of said original.

3. The invention according to claim 1 wherein said web transport means comprises a transport roller, and a pressure roller movable from an initial position into engagement with said transport roller when said web reaches its first position, and said control means comprises means for driving said transport roller in one direction, first switch means interconnecting said driving means and said pressure roller and responsive to movement of said pressure roller from its initial position to cause said driving means to drive said transport roller in the opposite direction for transporting said web to its second position, and second switch means interconnecting said driving means and said pressure roller and responsive to movement of said pressure roller to its initial position to cause said driving means to drive said transport roller in its normal direction for returning said web to its first position.

4. The invention according to claim 1 wherein said web transport means includes a drive roller movable into engagement with said web while in its first position for moving said web from said first to said second position, web take-up means normally biased to take up said web as it is moved to said second position, and means for disengaging said drive roller from said web when it reaches its second position whereby said transport means returns said web to its first position.

5. The invention according to claim 4 wherein said disengaging means is responsive to said web take-up means.

6. A thermographic copying device for making copies of an original on receiving paper, comprising:

an exposing station for producing radiation rich in infrared;

a copying station;

means including a tendency driven take-up reel for transporting a heat-sensitive web in one direction through said exposing station to thermographically produce an image of said original in a corresponding area of said web, and for transporting said web after passage through said exposing station in said one direction through said copying station;

means responsive to an original fed into engagement with said web for actuating said transporting means for transporting a composite of said original and web through said exposing station;

means for braking said take-up reel while said web is being transported through said exposing station to prevent further transport of said web through said copying station and causing slack to develop in said web;

means for taking up the slack in said web;

means actuated by said slack take-up means for stopping the transport of said web through said exposing station, and releasing said take-up reel for winding the slack web to a first position in which one end of said area of said web is positioned at one end of said copying station;

pressure means at said copying station movable between a normal relieved condition, in which no pressure is exerted on said web, and a pressure condition in which pressure is exerted on said web and said web is moved by said pressure means in the opposite direction;

means responsive to said web take-up means when said web is wound to said first position for moving said pressure means to its pressure condition;

means responsive to said web take-up means when said web is wound to said first position for feeding a sheet of receiving paper into said pressure means with its leading end in register with said one end of said area of said web, said pressure means moving said receiving paper and said web in the opposite direction in intimate pressure contact through said pressure means only for producing a copy of said original on said receiving paper, said web take-up means accumulating the slack developed in said web during such movement of said web in said opposite direction; and means responsive to said web take-up means when said receiving paper has passed through said pressure means for moving said pressure means to its relieved condition allowing said take-up reel to return said web to its first position.

References Cited

UNITED STATES PATENTS

| | | | |
|---|---|---|---|
| 2,501,495 | 3/1950 | Carroll et al. | 101—470 |
| 2,503,758 | 4/1950 | Murray | 117—37 |
| 3,148,617 | 9/1964 | Roshkind | 101—470 |

RALPH G. NILSON, *Primary Examiner.*

A. L. BIRCH, *Assistant Examiner.*

U.S. Cl. X.R.

101—470